(12) United States Patent
Rasche et al.

(10) Patent No.: US 8,209,455 B2
(45) Date of Patent: Jun. 26, 2012

(54) CONTROL AND/OR DATA-TRANSMISSION MODULE

(75) Inventors: Alexander Rasche, Blomberg (DE); Hans-Peter Hudetz, Hameln (DE); Udo Haumersen, Detmold (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 428 days.

(21) Appl. No.: 12/525,693

(22) PCT Filed: Feb. 1, 2008

(86) PCT No.: PCT/EP2008/000813
§ 371 (c)(1),
(2), (4) Date: Sep. 3, 2009

(87) PCT Pub. No.: WO2008/095649
PCT Pub. Date: Aug. 14, 2008

(65) Prior Publication Data
US 2010/0146167 A1 Jun. 10, 2010

(30) Foreign Application Priority Data
Feb. 7, 2007 (DE) .................. 10 2007 006 830

(51) Int. Cl.
*G06F 13/00* (2006.01)
*H01R 9/26* (2006.01)
(52) U.S. Cl. ............... 710/301; 710/100; 361/679.4
(58) Field of Classification Search .......... 361/600–792; 710/100, 104, 300, 301
See application file for complete search history.

(56) References Cited

U.S. PATENT DOCUMENTS

| 4,477,862 A | 10/1984 | Gonzales |
| 4,558,914 A | 12/1985 | Prager et al. |
| 4,790,762 A | 12/1988 | Harms et al. |
| 5,641,313 A * | 6/1997 | Hohorst ............... 439/709 |
| 5,961,335 A * | 10/1999 | Kubernus et al. ........... 439/76.1 |

(Continued)

FOREIGN PATENT DOCUMENTS
DE     38 00 077 A1   7/1989
(Continued)

OTHER PUBLICATIONS

Hans Joachim Gerstein, "German Opposition for German Patent No. 10 2007 006 830 B1", Dec. 14, 2009, Publisher: German Patent Office, Published in: Munich.

(Continued)

*Primary Examiner* — Glenn A Auve
(74) *Attorney, Agent, or Firm* — DeMont & Breyer, LLC

(57) ABSTRACT

The invention relates to a control and/or data-transmission system comprising a number of I/O modules connected in series one adjacent to the other and a control and/or data-transmission module, as well as a control and/or data-transmission module for controlling I/O modules for such a control and data-transmission system. The invention proposes a control and data-transmission system that comprises a number of I/O modules connected in series one adjacent to each other, wherein each I/O module comprises at least one I/O signal channel and also at least one first signal terminal for connecting the I/O signal channel to a data bus and at least one second signal terminal for connecting a bus subscriber to the I/O signal channel, and wherein the system comprises a control and/or data-transmission module that comprises control electronics for the selective control of the number of I/O modules and that forms a detachable unit.

23 Claims, 3 Drawing Sheets

U.S. PATENT DOCUMENTS

| | | | | |
|---|---|---|---|---|
| 6,027,379 | A | * | 2/2000 | Hohorst ......................... 439/715 |
| 6,038,130 | A | * | 3/2000 | Boeck et al. .................. 361/735 |
| 6,172,875 | B1 | * | 1/2001 | Suzuki et al. ................. 361/729 |
| 6,175,932 | B1 | * | 1/2001 | Foote et al. .................. 714/5.11 |
| 6,308,231 | B1 | | 10/2001 | Galecki et al. |

FOREIGN PATENT DOCUMENTS

| | | |
|---|---|---|
| DE | 43 16 291 A1 | 11/1994 |
| DE | 44 02 002 A1 | 7/1995 |
| DE | 44 38 804 C1 | 3/1996 |
| DE | 44 38 806 C1 | 3/1996 |
| DE | 296 11 543 U1 | 10/1996 |
| DE | 196 00 997 A1 | 7/1997 |
| DE | 196 16 516 C1 | 7/1997 |
| DE | 698 16 236 T2 | 2/2004 |
| DE | 202006006659 U1 | 7/2006 |
| EP | 0 661 915 A1 | 7/1995 |
| EP | 0 896 504 A2 | 2/1999 |
| EP | 1 569 055 A1 | 8/2005 |

OTHER PUBLICATIONS

Gram, Lins & Partner GBR, "WAGO-I/O-System 750, Modular I/O System", "Guidelines and recommendations for increasing operational safety", 2005, Publisher: WAGO Kontakttechnik GmbH & Co. KG, Published in: Germany.

, "I/O Fieldbus Components", "Catalogue", Apr. 2001, pp. 1162, No. 225319, Publisher: Moeller GmbH, Published in: DE.

, "WINbloc das kompakte I/O-System", Nov. 2000, pp. 110, Publisher: Moeller GmbH, Published in: DE.

Gerstein, Hans-Joachim, "European Opposition against EP Patent No. 2115539 EP Application No. 08707499", Publisher: EPO, Published in: EP.

"German Office Action for International German Application No. 10 2007 006 830.3-31", dated Sep. 18, 2007, Publisher: German Patent Office, Published in: DE.

PCT International Preliminary Examination Report, International application No. PCT/EP2008/000813, dated Mar. 16, 2009, Publisher: PCT.

PCT International Search Report and Written Opinion, International application No. PCT/EP2008/000813, Publisher: PCT, Dated Jun. 13, 2008, Examiner: Martin Sundin X.

* cited by examiner

CONTROL AND/OR DATA-TRANSMISSION MODULE

FIELD OF THE INVENTION

The invention relates to a control and/or data-transmission system comprising a number of I/O modules connected in series one adjacent to the other and a control and/or data-transmission module, as well as a control and data-transmission module for controlling I/O modules for such a control and data-transmission system.

BACKGROUND OF THE INVENTION

In the field of automotive engineering, for the automation of complex, logical links, error processes, or time sequences, time relays, counters, or relays often satisfy the requirements according to a universal controller only to a limited extent. Compact SPS (memory programmable control) systems are often overdimensioned in their technical equipment features for small applications and consequently are also too expensive in production.

SUMMARY OF THE INVENTION

In order to close these gaps, small or very small control modules or logic modules are known that offer to the user the advantage that he can still realize a large number of applications from the lower power range only with an automation component. According to the model and expansion, between 6 and 48 inputs or outputs, called I/O below, can be processed with such control or logic modules currently on the market. For the subsequent description and the claims, it is further assumed that a signal coming from, processed by, or merely passed through a bus subscriber, e.g., a sensor, is led to a data bus via an input and a signal coming from, processed by, or merely passed through a data bus is led to a bus subscriber, e.g., an actuator, via an output.

The programming of such control or logic modules can be performed, for example, directly on the control or logic module and/or with graphical software. In many cases, this is realized using a functional block technique that is also easy to perform without programming knowledge. In all of the currently known control or logic modules, the following basic functions and functional blocks are standards: AND, OR, NOT, XOR, NAND, NOR, switching delay, pulse generator, current pulse relay, counter, clock generator.

All control or logic modules currently available on the market are available in nearly uniform housings that are adapted for small/field distributors. Individually, there are also printed circuit board variants.

Relays to be controlled, however, are integrated rigidly in the control or logic modules. Standard modern modules typically have 8 inputs and 4 outputs, wherein, for example, 6 inputs are provided for digital signals and 2 inputs are provided for analog signals. Variants with relay or transistor outputs are also known.

One essential disadvantage of the state of the art is that, in such control or logic modules, only a fixed number of inputs and outputs can always be provided. In addition, if a relay should become defective, then the entire control or logic module must be exchanged.

Thus, one problem of the invention consists in creating a system with which a plurality of terminals of a small control and/or data-transmission module can be used individually as an input or as an output for a control and/or data-transmission signal.

Another problem further consists in that I/O electronics could be allocated individually to each input or output.

Another problem consists in that, in the case of a defect in the I/O electronics, a faster and simpler exchange is possible.

The invention thus proposes a control and data-transmission system that comprises a number of I/O modules arranged in series one adjacent to the other, wherein each I/O module comprises at least one I/O signal channel and also at least one first signal terminal for connecting the I/O signal channel to a data bus and at least one second signal terminal for connecting a bus subscriber to the I/O signal channel, and wherein the system comprises a control and/or data-transmission module that comprises control electronics for the selective control of the number of I/O modules and is interconnected mechanically to the number of I/O modules and forms, with these modules, a detachable unit.

The invention further proposes a control and/or data-transmission module for controlling I/O modules for a control and data-transmission system in which each I/O module comprises at least one I/O signal channel and also one first signal terminal for connecting the I/O signal channel to a data bus and second signal terminal for connecting a bus subscriber to the I/O signal channel and each I/O module further has a first connection device. The control and/or data-transmission module has a number of second connection devices that are constructed complementary to the first connection devices and that are arranged in series on the housing of the control and/or data-transmission module for the detachable, mechanical connection of the control and/or data-transmission module to a corresponding number of I/O modules arranged in series one adjacent to the other, and control electronics accommodated in the housing for the targeted control of I/O modules connected to the control and/or data-transmission module.

The control and data-transmission module comprises a number of third signal terminals allocated to the control electronics corresponding to the number of I/O modules connected to this module, wherein the number of third signal terminals and the number of second connection devices are arranged relative to each other such that when the control and/or data-transmission module is connected to the number of I/O modules, a third signal terminal is paired with a first signal terminal or a third signal terminal is paired with a second signal terminal.

The control and data-transmission system preferably further has a number of fourth signal terminals that are allocated to the control electronics and that are accessible for pairing from outside the control and/or data-transmission module. The fourth signal terminals are connected, in particular, to an integrated terminal strip.

The control electronics of the control and data-transmission module according to the invention is preferably programmable. For this purpose, the module comprises, in particular, a communications interface connector for connecting the control electronics to a remote data-processing device.

For preparing the signal channel, an I/O module preferably comprises I/O electronics that are arranged between the first and second signal terminals and that preferably can be plugged into the I/O module.

The I/O modules could comprise fifth signal terminals for connecting the I/O electronics to a bus connector, wherein the I/O electronics are constructed for transmitting data between the fifth signal terminal and the first signal terminal or for transmitting data between the fifth signal terminal and the second signal terminal.

In an especially preferred way, the control and data-transmission module is constructed with a communications interface connector connected to the control electronics for connecting the control and/or data-transmission module to another control and/or data-transmission module.

It is further advantageous to provide the control and/or data-transmission module with an ejection device for the manual detachment of the connection between the control and/or data-transmission module and the number of I/O modules.

In summary, the invention thus guarantees a control and/or data-transmission system in which a control and/or data-transmission module can be connected detachably to a given number of I/O modules, in particular, by a plug-in or clamp connection. Thus, according to the arrangement of the I/O modules, each terminal could be defined, in principle, as an input or output and, according to preferred refinements, I/O electronics could be allocated individually to each input or output, wherein, in a further preferred refinement, the connection between the I/O module and I/O electronics is also detachable, so that, e.g., the I/O electronics of one I/O module could also be exchanged without exchanging this I/O module. The I/O modules that could be connected to a control and/or data-transmission module according to the invention could also be assembled individually, for example, with the function of a relay, optocoupler, PLC-VT, or also a simple signal pass-through module.

In case of a defect in an I/O module or I/O electronics, the defective part or parts can be exchanged easily and thus replaced by new part or parts. By means of a terminal strip integrated in the control and/or data-transmission module, an additional number of advantageously digital inputs and/or outputs can be processed. Furthermore, according to preferred embodiments, several control and/or data-transmission modules can be interconnected and operated in common, but also individually, for example, by means of a control module adapted as a master. The programming of the control electronics is preferably performed by means of software, wherein the control program is created, for example, by means of function building blocks. Thus, user-based function building blocks could also be created and integrated into a base program. Consequently, such function building blocks can be easily exported and/or imported, e.g., by means of a connected PC.

BRIEF DESCRIPTION OF THE DRAWINGS

The invention will be described in greater detail below using a preferred embodiment with reference to the accompanying drawings.

Shown in the drawings are.

DETAILED DESCRIPTION

Figure 1:
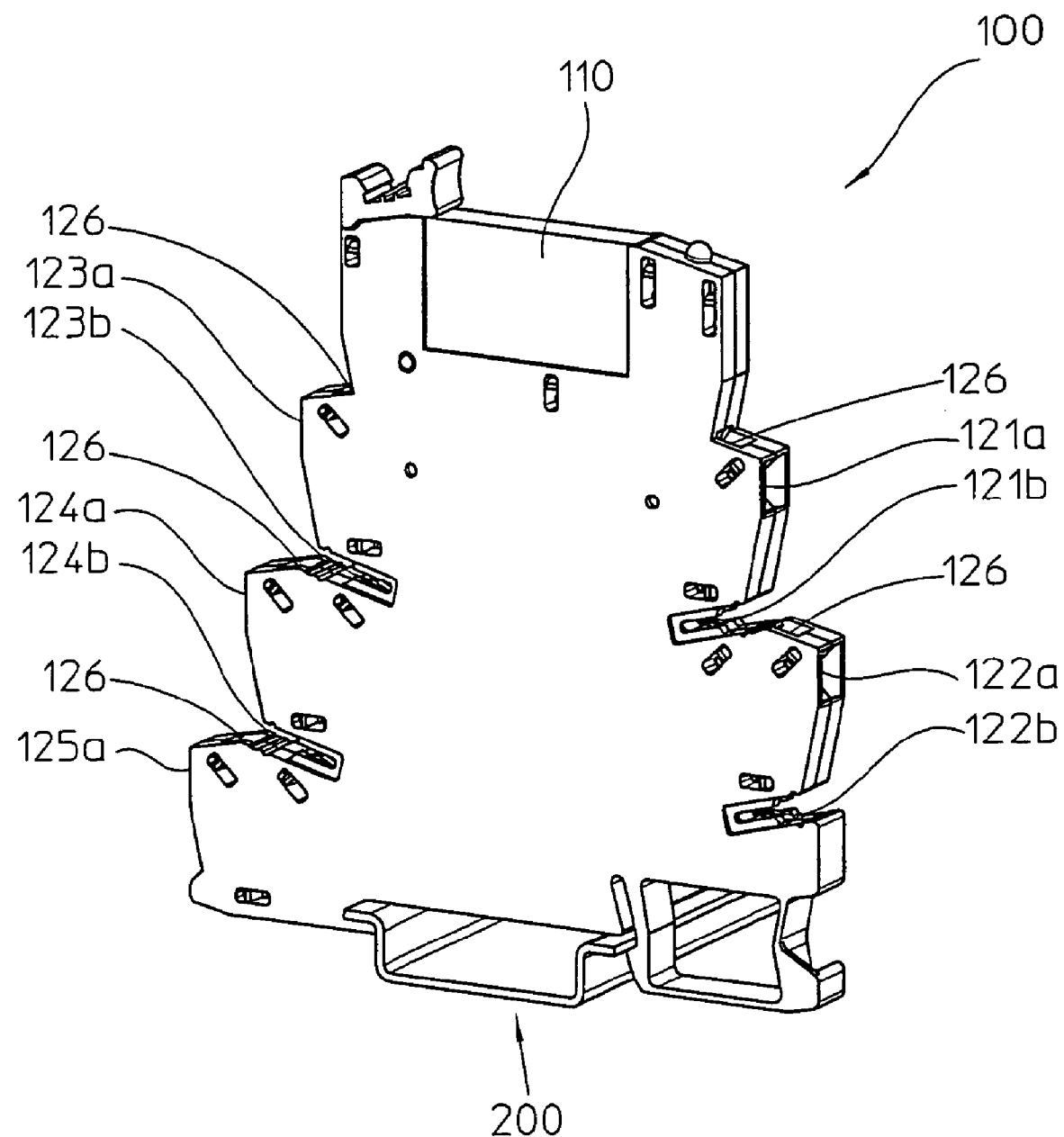
FIG. 1, an example I/O module for use within the invention.

At first, reference is made to FIG. 1. To be seen is an input/output module or I/O module 100 in a preferred embodiment of a series clamp that can be clamped onto a carrier rail 200. The I/O module 100 comprises input/output electronics or I/O electronics 110 that are, in the shown embodiment, I/O electronics 110 that can be plugged into the I/O module housing, and have a number of conductor terminals on the module housing. The conductor terminals extend, e.g., into conductor terminal funnels 121*a*, 122*a*, 123*a*, 124*a*, and 125*a* to each of which an operating opening 126 for a screw or spring clip is allocated. A few conductor terminals also extend into plug contacts 121*b*, 122*b*, 123*b*, and 124*b*. These plug contacts arranged parallel to the conductor terminal funnels are located within slots or bridge shafts arranged on the I/O module housing.

Such an I/O module, e.g., sold by Phoenix Contact GmbH & Co., Blomberg, or another module is connected in a known way between a bus subscriber, such as, for example, actuators, sensors, and other devices, and a data bus of an automation system. According to which bus subscriber or which type of bus subscriber is coupled via the I/O module to the data bus, the corresponding I/O module 100 or the I/O electronics 110 in the case of an I/O module that can be equipped individually with I/O electronics provide a signal channel by means of which, with reference to the data bus, input signals or output signals, i.e., control and/or data-transmission signals, are processed in a given way. The I/O modules and/or the I/O electronics can furthermore also be constructed for providing signal channels merely for passing through such signals, i.e., without performing signal processing. The power supply for the module electronics and the power supply for the bus subscribers connected to the I/O module can be realized separately or together.

In each case, however, at least one terminal as a control signal and/or data-transmission signal terminal, also called signal terminals below and in the claims, is allocated to the signal channel of the I/O module or the I/O electronics set via a terminal line paired with this channel as an input or output to the data bus. In the present example according to FIG. 1, this is the terminal 121*a* that could be paired by means of a screw or clamp connection, as well as the parallel plug terminal 121*b*. Another terminal is allocated to the signal channel of the I/O module or the I/O electronics 110 such that this channel must be set via a corresponding connection to the bus subscriber, in the present case, for example, the terminal 125*a*. The terminals for the bus subscriber and also for the data bus are thus accessible in the present case from the side of the I/O module, wherein, however, this is not absolutely necessary.

A plurality of such I/O modules that comprise relays or optocouplers with terminals for digital or also analog signal processing or that also provide merely simple pass modules for passing through a control and/or data-transmission signal can be arranged in series in a known way one adjacent to the other, according to FIG. 1, arranged in series one adjacent to the other on the carrier rail 200.

Figure 2:
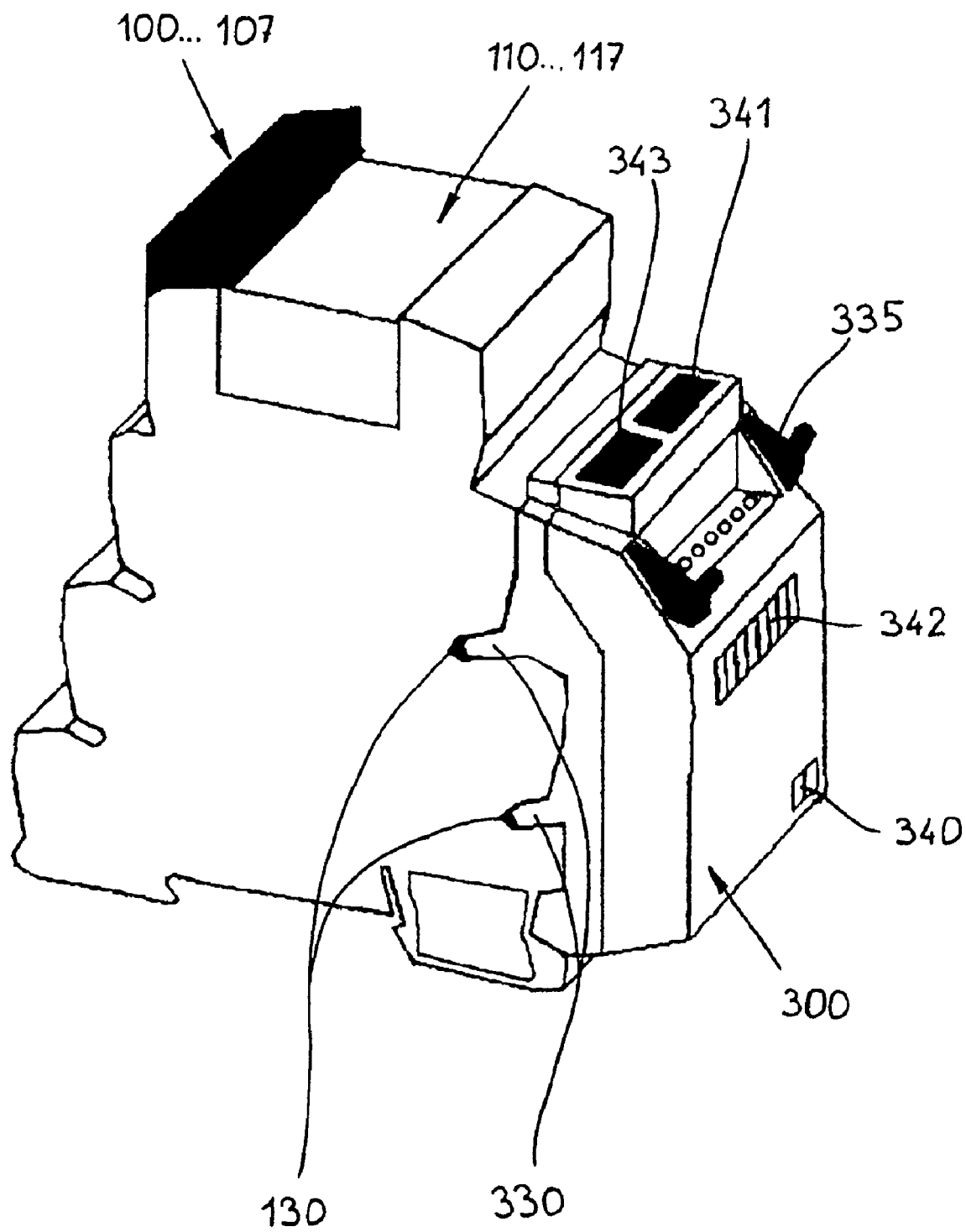
FIG. 2, greatly simplified and schematized, an arrangement of 8 I/O modules according to FIG. 1 in series one adjacent to the other in connection with a control and/or data-transmission module according to the invention, and FIG. 3, an example arrangement of additional I/O modules for use within the invention.

FIG. 2 shows a strongly simplified and schematized view of a control and/or data-transmission system according to the invention under the use of a number of I/O modules, e.g., eight I/O modules 100 . . . 107 each with I/O electronics 110 . . . 117 according to FIG. 1 that are arranged one adjacent to the other on the carrier rail not shown in FIG. 2. Furthermore, a control and/or data-transmission module 300 according to the invention is again connected detachably to these I/O modules. According to the embodiment of FIG. 2, the module 300 is plugged into bridge shafts 130 in which the plug contacts 121*b* and 122*b* are arranged. A first connection device of each of the I/O modules for connecting to the module 300 is consequently provided by the slots or bridge shafts 130. The control module has connecting pieces 330 that are formed complementary to these slots or shafts and that have contact terminals, wherein these contact terminals, not shown in FIG. 2, can be plugged in and are complementary to the plug contacts arranged in the bridge shafts. A second connection device of the module 300 for connecting the module 300 to a predetermined number of I/O modules 100 ... 107 is consequently provided by the connecting pieces 330. Furthermore, the control module has an ejection device 335 with which the connecting pieces 330 can be moved out from the bridge shafts 130 again through manual activation of a pivot lever, so that the connection can be detached again at any time. Thus, the I/O modules 100 ... 107 are provided to contain or carry the control and data-transmission module 300.

Through the arrangement of connecting pieces 330 and pluggable contact terminals in series one next to the other provided by the application-specific control and/or data-transmission signal terminals that are arranged in series one next to the other and that are connected accordingly to control electronics integrated in the module for signal processing, the control and/or data-transmission module 300 according to the invention consequently can be connected mechanically to a predetermined number of I/O modules arranged in series one next to the other. The arrangement of the pluggable contact terminals on the connecting pieces also offers an extremely efficient arrangement between the mechanical connection devices of the module 300 and the control and/or data-transmission signal terminals of the module 300, in order to allow, when the module 300 is connected to the I/O modules 100 ... 107, a pairing of a corresponding control and/or data-transmission signal terminal of the module 300 with a correspondingly to be allocated control and/or data-transmission terminal 121$b$ of an I/O module.

The control module further has a power-supply terminal 340. Furthermore, the shown control and/or data-transmission module is configured with a communications interface 341, in the present example, an RS 232 interface, for programming the control electronics that are integrated in the module 300 and that comprise, in particular, a CPU, via an external PC.

Figure 3:
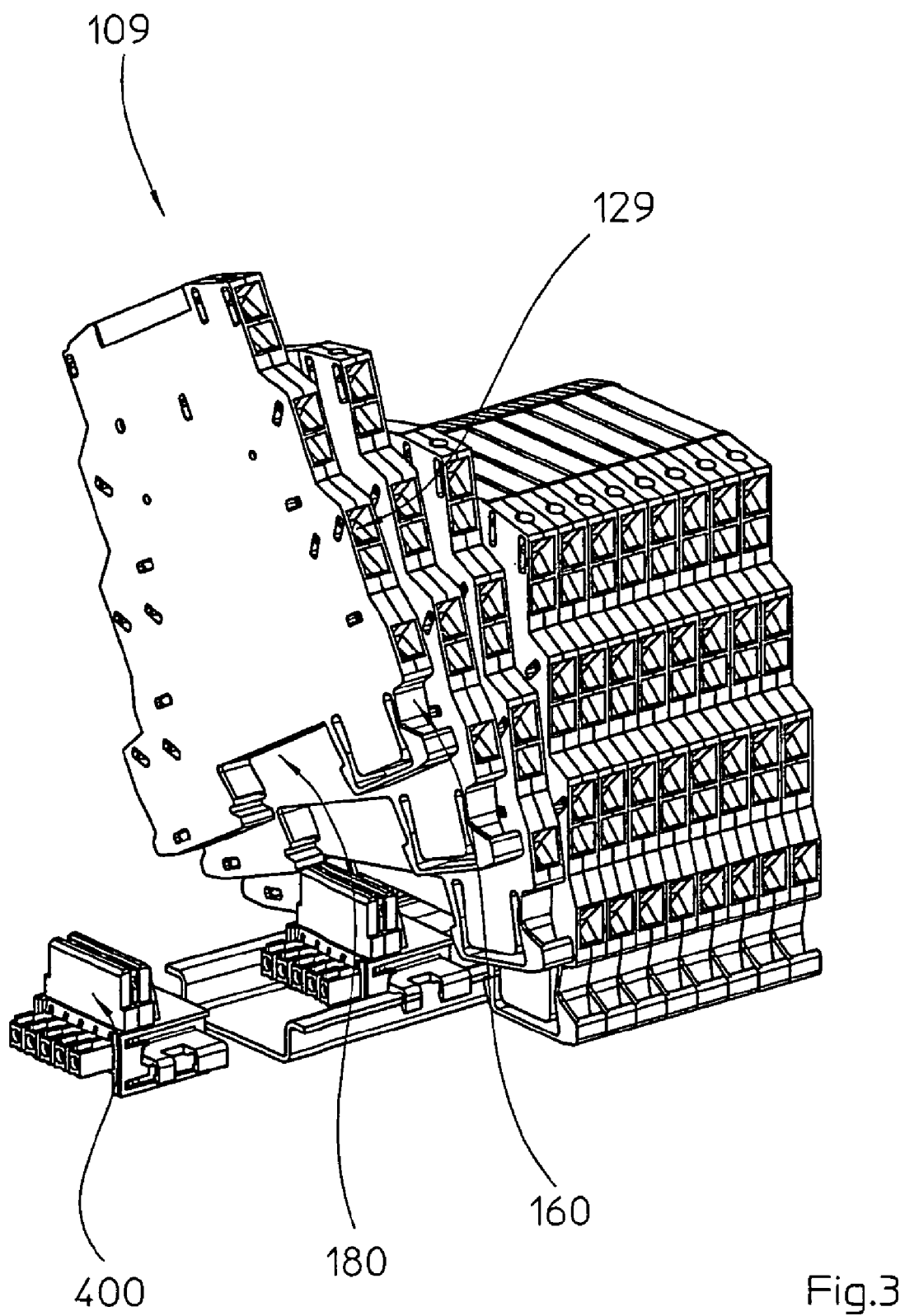

The control and/or data-transmission module further comprises a terminal strip 342, in the present example, an 8-pole clamping strip, by means of which additional input signals can be processed with the control electronics and that provides, according to the configuration from FIG. 3, additional digital inputs for the module 300, that is, an additional 8 digital inputs. It should be noted that, according to the specific construction of a control and/or data-transmission module according to the invention, additional analog inputs/outputs could also be provided by means of such a terminal strip or a similar strip, but these additional inputs/outputs typically require significantly more space in the housing of the control and/or data-transmission module.

In addition, the control module has a communications interface 343 for communicating with another, not-shown control and/or data-transmission module. Another such control and/or data-transmission module can comprise, in turn, another corresponding communications interface, in order to connect again another control and/or data-transmission module to the system. The control and/or data-transmission module shown in FIG. 2 thus can also function as a master and can be operated according to the capabilities and programming of the control electronics with a number of additional control and/or data-transmission modules connected as slaves.

For example, the control electronics of the shown control and/or data-transmission module is constructed to be able to process 48 I/O's in a digital and/or analog way, so that, in this case, three control and/or data-transmission modules as shown in FIG. 2 can be combined together by means of communications interfaces 343 and one of these acts as a master. In contrast, the control and/or data-transmission modules that act as slaves must process, for example, only 16 I/O's or bus subscribers connected to these inputs/outputs and can forward the correspondingly processed control and/or data-transmission signals to the control electronics of the master I/O module.

Whether the I/O modules connected to a control and/or data-transmission module 300 provide relays, optocouplers, and/or additional I/O electronics or also only pure pass modules can be set by means of the program on the programmable control electronics of the control and/or data-transmission module 300, so that the control electronics of each I/O module can be used accordingly. Each I/O module thus can be equipped individually and one is not limited to one component type for all of the control electronics. Instead, the inputs and outputs can be equipped as the user requires.

The programming of the control electronics is preferably performed by means of software and the control program is created, for example, by means of function building blocks. User-based function building blocks can be created and integrated into a given basic program for expansion. Due to the communications interfaces integrated in the control and/or data-transmission module, such expanded function building blocks can also be exported or imported and consequently, in a simple way, a simulation on a computer for programming can also be easily performed by means of monitoring.

An additional or alternative possibility for programming or also parameterizing the control electronics of the control and/or data-transmission module or its states in the inverse direction, for example, displaying on an HMI, consists in using I/O modules that have at least one additional signal terminal that can be connected to a bus plug.

Such a bus plug 400 is to be inferred, for example, from FIG. 3. The bus plug 400 is arranged for the I/O modules 109 according to FIG. 3, configured as an alternative to the application of the invention, in the lower region 180 above which a corresponding I/O module is set on the carrier rail, wherein, in this case, at least the I/O module that is connected to such a bus plug or to a similar bus plug is constructed in the connection region with another signal terminal.

In the case of the I/O module 109 shown in FIG. 3, first connection devices are provided for connecting to a control and/or data-processing module according to the invention, e.g., through notches 160 arranged on both sides, wherein second, complementary connection devices of the control and/or data-transmission module then form, e.g., pliers-like clamping legs that engage behind the notches 190 when the control and/or data-transmission module is set on a number of I/O modules 109. A control and/or data-transmission signal terminal connected to control electronics for signal processing integrated in the control and/or data-transmission module is constructed, in this case, e.g., as a pin contact that engages in the funnel 129 and is paired with the terminal arranged therein.

The invention claimed is:

1. A control and data-transmission system comprising:
a plurality of I/O modules (100 ... 107) arranged in series one adjacent to the other, wherein each I/O module in the plurality of I/O modules comprises at least one I/O signal channel, as well as at least one first signal terminal for connecting the I/O signal channel to a data bus and at least one second signal terminal for connecting a bus subscriber to the I/O signal channel; and
a control and/or data-transmission module (300), wherein the control and/or data-transmission module comprises control electronics for selective control of the I/O modules and is interconnected mechanically to the I/O modules and forms, with these modules, a detachable unit, and wherein the plurality of I/O modules is provided, in order to contain the control and/or data-transmission module (300).

2. The control and data-transmission system according to claim 1 further characterized in that each I/O module further has a first connection device (130) and the control and/or data-transmission module has a plurality of second connection devices (330), wherein each of the second connection devices is constructed complementary to the first connection device, and the plurality of second connection devices are arranged in series on a housing of the control and/or data-transmission module (300) for the detachable, mechanical connection of the control and/or data-transmission module (300) to a corresponding plurality of I/O modules (100 . . . 107) arranged in series one adjacent to the other.

3. The control and data-transmission system according to claim 1, wherein the control and/or data-transmission module furthermore has a plurality of third signal terminals allocated to the control electronics, wherein the plurality of third signal terminals and a plurality of second connection devices of the control and/or data-transmission module are arranged relative to each other such that when the control and/or data-transmission module is connected to the plurality of I/O modules, a third signal terminal is paired with a first signal terminal or a third signal terminal is paired with a second signal terminal.

4. The control and data-transmission system according to claim 3, wherein the control and/or data-transmission module furthermore has a plurality of fourth signal terminals that are allocated to the control electronics and that are accessible from outside the control and/or data-transmission module for pairing.

5. The control and data-transmission system according to claim 4, wherein the control and/or data-transmission module integrates a terminal strip (342) to which the fourth signal terminals are connected for pairing.

6. The control and data-transmission system according to claim 4, wherein the fourth signal terminals are allocated to inputs of the control electronics for processing digital input signals.

7. The control and data-transmission system according to claim 1 further characterized in that the control electronics are programmable.

8. The control and data-transmission system according to claim 7 further characterized by a communications interface connector (341) arranged on the control and/or data-transmission module for connecting the control electronics to a remote data-processing device.

9. The control and data-transmission system according to claim 1, wherein the I/O modules are constructed to be set up on a carrier rail (200).

10. The control and data-transmission system according to claim 1, wherein the I/O modules comprise I/O electronics (110 . . . 117) arranged between each first and second signal terminal.

11. The control and data-transmission system according to claim 10, wherein the I/O modules comprise fifth signal terminals for connecting the I/O electronics to a bus connector, wherein the I/O electronics are constructed for transmitting data between the fifth signal terminal and the first signal terminal or for transmitting data between the fifth signal terminal and the second signal terminal.

12. The control and data-transmission system according to claim 1 further characterized by a power-supply terminal (340) allocated to the control electronics.

13. The control and data-transmission system according to claim 1 further characterized by a communications interface connector (343) connected to the control electronics for connecting the control and/or data-transmission module of claim 1 to a second control and/or data-transmission module having the features of claim 1.

14. A control and/or data-transmission module for controlling I/O modules for a control and data-transmission system in which each I/O module comprises at least one I/O signal channel and also a first signal terminal for connecting the I/O signal channel to a data bus and second signal terminal for connecting a bus subscriber to the I/O signal channel and each I/O module further has a first connection device, wherein the control and/or data transmission module comprises:
　a plurality of second connection devices, each of the second connection devices is constructed complementary to the first connection devices of an I/O, and the plurality of second connection devices are arranged in series on a housing of the control and/or data-transmission module for the detachable, mechanical connection of the control and/or data-transmission module to a corresponding plurality of I/O modules arranged in series one adjacent to the other, wherein the control and/or data-transmission module is containable by the plurality of I/O modules arranged in series one next to the other; and
　control electronics accommodated in the housing for the selective control of I/O modules connected to the control and/or data-transmission module.

15. The control and/or data-transmission module according to claim 14 further characterized in that the control electronics are programmable.

16. The control and/or data-transmission module according to claim 14 further characterized by a communications interface connector for connecting the control electronics to a remote data-processing device.

17. The control and/or data-transmission module according to claim 14 that further has a plurality of third signal terminals allocated to the control electronics, wherein the plurality of third signal terminals and a plurality of second connection devices of the control and/or data-transmission module are arranged relative to each other such that, when the housing is connected to the plurality of I/O modules, a third signal terminal is paired with a first signal terminal or a third signal terminal is paired with a second signal terminal.

18. The control and/or data-transmission module according to claim 14 that further has a plurality of fourth signal terminals that are allocated to the control electronics and that are accessible from outside the housing for pairing.

19. The control and/or data-transmission module according to claim 18 that integrates a terminal strip arranged on the housing, wherein the fourth signal terminals are connected to this terminal strip for pairing.

20. The control and/or data-transmission module according to claim 18, wherein the fourth signal terminals are allocated to inputs of the control electronics for processing digital input signals.

21. The control and/or data-transmission module according to claim 14 further characterized by a power-supply terminal allocated to the control electronics.

22. The control and/or data-transmission module according to claim 14 further characterized by a communication interface connector connected to the control electronics for connecting the control and/or data-transmission module of claim 14 to a second control and/or data-transmission module having the features of claim 14.

23. The control and/or data-transmission module according to claim 14 characterized by an ejection device for the manual detachment of the connection between the control and/or data-transmission module and the plurality of I/O modules.

* * * * *